No. 609,171. Patented Aug. 16, 1898.
W. X. STEVENS.
BICYCLE FRAME.
(Application filed Feb. 11, 1897.)
(No Model.)
Fig. I.
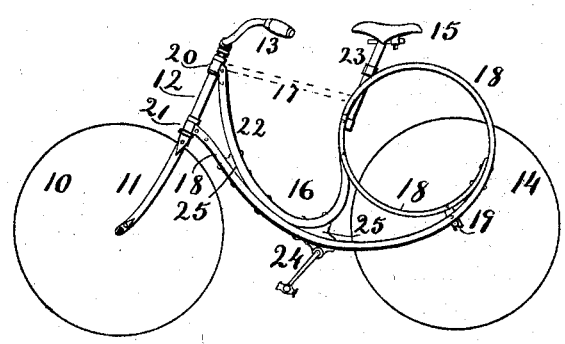
Fig. II.
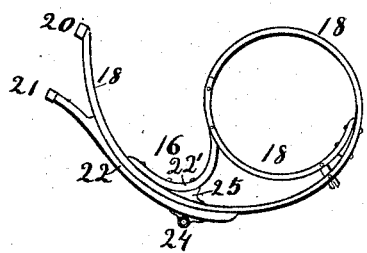
Fig. III.
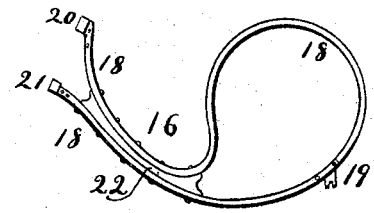
Fig. IV.
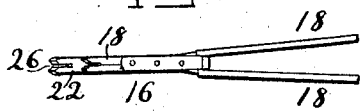
Witnesses
N. Stevens
Albert Speiden
Inventor
William X. Stevens

UNITED STATES PATENT OFFICE.

WILLIAM X. STEVENS, OF WASHINGTON, DISTRICT OF COLUMBIA.

BICYCLE-FRAME.

SPECIFICATION forming part of Letters Patent No. 609,171, dated August 16, 1898.

Application filed February 11, 1897. Serial No. 622,975. (No model.)

*To all whom it may concern:*

Be it known that I, WILLIAM X. STEVENS, a citizen of the United States, residing at Washington, in the District of Columbia, have invented a new and useful Improvement in Bicycle-Frames; and I do hereby declare the following to be a full, clear, and exact description of the same, reference being had to the accompanying drawings, in which—
Figure 1 represents a side elevation of a portion of a bicycle with a frame according to my invention. Figs. 2 and 3 represent side elevations of modifications of the frame. Fig. 4 represents in plan or top view the modification shown in Fig. 2, and in a general way it is a plan view of each of the four frames shown.

This invention relates to that class of safety-bicycles termed "drop-frame," which are particularly designed for ladies' use, but are often used by men.

The object of this invention is to adapt a drop-frame to be made light, strong, and graceful, particularly of wood, and yet some of the results accrue to tubular metallic frames. A great source of weakness in any made-up frame which, like the bicycle, is subjected to twisting strains in service is short lap of the joints. Consequently the more joints there are and the shorter the laps the less stable the frame is likely to be, and vice versa. Therefore this frame is designed to require the fewest practicable number of joints, and where there must be joints the design is to bring the parts together as nearly parallel as possible, so as to admit of long lapping joints.

To this end the invention consists in the construction and combination of parts forming a bicycle-frame hereinafter described and claimed.

10 represents the forward wheel of a bicycle, mounted in a fork 11, which is provided with a shaft 12 and handle-bar 13. 14 represents the rear wheel, 15 the saddle, and 16 the reach.
In the present case the reach is dropped as low as practicable in order that it may not interfere with ladies' feet in mounting nor with ladies' dresses while riding, and on that account the reach on ladies' bicycles is usually called the "drop," as distinguished from the diamond frame, which is provided with an upper reach-bar, as indicated by the dotted lines 17.

18 represents two side bars which in every case extend in curved form from the reach rearward at each side of the rear wheel 14, to which they serve as bearings at 19, and thence up and forward, forming complete loops to the rear of the reach by returning upon themselves either in circular loops, as in Figs. 1 and 2, or in a curved balloon-shaped loop, as in Fig. 3. The side bars 18 preferably extend forward also as portions of the reach and are connected with the shaft 12 at one of the shaft-bearings 20 or 21. As shown in Fig. 2 they are connected at bearings 20, in Fig. 1 at bearings 21, and in Fig. 3 at both bearings 20 and 21.

In each style of frame there is some kind of a stiffener 22, forming part of the reach, this stiffener varying in form to suit the different forms of frames. In Fig. 1 the stiffener 22 is U-shaped, starting at joint 20 and passing down across the drop as the upper member of the reach 16 and thence upward, terminating in the region of the saddle-post 23 between the side bars 18. It may be found profitable to fit this end of the stiffener to receive the saddle-post as the direct support thereof, the stiffener in every case being rigidly secured to the adjacent parts of the frame. In Fig. 2 the stiffener 22 extends from joint 21 rearward across the drop portion as the lower member of the reach 16 and may terminate in the region of the crank-hanger 24, as in Fig. 2.

In Fig. 2 an additional stiffener is used corresponding with the stiffener 22 of Fig. 1, excepting that its forward end is not attached to the bearing 20, but stops a little forward of the middle of the drop-space and forms the connection with the bearing 21.

In Fig. 3 the stiffener 22 is inserted between the upper and lower members of the reach, both of which members are in this instance portions of the side bars 18. To further stiffen the frame, corner-pieces 25 may be rigidly secured in the angles.

The reason for using the stiffeners described exists in the fact that pieces of wood which vary suddenly in thickness at different points cannot be easily bent to even curves by the usual steaming process, so it is more practicable to bend the pieces separately or to bend those which are to be much curved and to saw out those which may lie nearly in line of the grain of the wood and to afterward unite them by long lap-joints either with glue, rivets, or bolts or with any of them combined. Where the pieces are to remain permanently united, glue and rivets are the best; but where some future contingency may require the parts to be separated bolts are better. In this frame the joint 21 and the joints at the ends of the reach 17, if that be used, are the only places where the end of the grain of the wood is presented to the adjacent part, and in these the bearings 21 22, being metallic, may be provided with tangs to enter the reach by a slot or mortise, such as is shown at 26, in the wood. The bearing 20 may also be thus joined with the frame.

It will be seen as a peculiarity in bicycle construction that there are no inserted joints. This becomes necessary from the fact that in course of time the very best wood driven into a metallic socket will shrink and become loose. This curved frame has a similar advantage when constructed of metallic tubing. The only socket-joint required is at the bearing 21 and at 20, if the reach 17 be used, where the tube would be presented endwise to the joint. All other joints being tangential, the adjacent lapping sides of the tubing furnish plenty of contact-surface to insure a strong joint by welding, brazing, or soldering, as the case may require.

It has not been thought advisable to show in the drawings of this application any views especially illustrating the characteristics of a tubular metal frame, because the present state of the art does not require it in a general way and because I am perfecting an invention in that branch on which I intend to make application for a patent.

It will be readily understood that the frame shown is to derive its whole stiffness from the direct connection of the reach between the rear-wheel and the forward-fork shaft and that from the rear-wheel bearings upward the side bars 18 become springs for the rider's seat 15.

Having thus fully described my invention, what I believe to be new, and desire to secure by Letters Patent, are the following claims:

1. In bicycle-frames, the combination of a pair of side bars adapted to be connected with the fork-shaft of a forward wheel and extending rearward through and forming portions of a drop-reach, and thence continuing rearward, parted to receive a rear wheel, and further extending upward, forward and downward in loop form, which loop is located to the rear of the drop in the frame; substantially as described.

2. In bicycle-frames, the combination of a drop-reach and side bars extending rearward and upward therefrom in loop form, the loop being located to the rear of the drop; substantially as described.

3. In bicycle-frames, the combination of a drop-reach, side bars extending in loop form to the rear of the reach and one or more stiffeners for the reach; substantially as described.

4. In bicycle-frames, the combination of side bars in loop form parted to receive the rear wheel and one or more reach-pieces extending forward from the loop to connect with a forward-wheel fork-shaft; substantially as described.

5. In bicycle-frames, the combination of a drop-reach and side bars extending rearward and upward therefrom in loop form, the loop being located to the rear of the drop.

In testimony whereof I affix my signature in presence of two witnesses.

WILLIAM X. STEVENS.

Witnesses:
ALBERT SPEIDEN,
WM. L. SPEIDEN.